United States Patent [19]
Ishii et al.

[11] Patent Number: 5,117,164
[45] Date of Patent: May 26, 1992

[54] LINEAR DRIVING APPARATUS

[75] Inventors: Hiroshi Ishii, Kashihara; Masaaki Ozaki, Tenri, both of Japan

[73] Assignee: Sharp Kabushiki Kaisha, Osaka, Japan

[21] Appl. No.: 431,783

[22] Filed: Nov. 6, 1989

[30] Foreign Application Priority Data

Nov. 30, 1988 [JP] Japan .................. 63-304358

[51] Int. Cl.$^5$ .................. H02P 5/28; G03G 15/00
[52] U.S. Cl. .................. 318/135; 355/235; 318/685
[58] Field of Search .............. 318/129, 135, 599, 119, 318/126, 687; 355/235

[56] References Cited

U.S. PATENT DOCUMENTS

| | | | |
|---|---|---|---|
| 4,636,697 | 1/1987 | Kunikawa | 318/436 |
| 4,996,564 | 2/1991 | Shirasugi | 355/235 |
| 5,015,936 | 5/1991 | Inoue | 318/687 |

FOREIGN PATENT DOCUMENTS

| | | |
|---|---|---|
| 3508817 | 3/1984 | Fed. Rep. of Germany . |
| 3343688 | 6/1984 | Fed. Rep. of Germany ...... 355/235 |
| 56-88687 | 7/1981 | Japan . |
| 58-192487 | 11/1983 | Japan . |

*Primary Examiner*—Steven L. Stephan
*Assistant Examiner*—Judson H. Jones

[57] ABSTRACT

A linear driving apparatus is provided wherein the driving output of a linear driving apparatus is adapted to be properly varied in the constant speed condition and the high acceleration condition for a moving object. Thereby the closer controlling operation may be effected not only in the high acceleration condition, but also in the constant speed condition if there is a considerable difference on the driving output of the linear driving apparatus in the constant speed condition and the high speed condition.

2 Claims, 6 Drawing Sheets

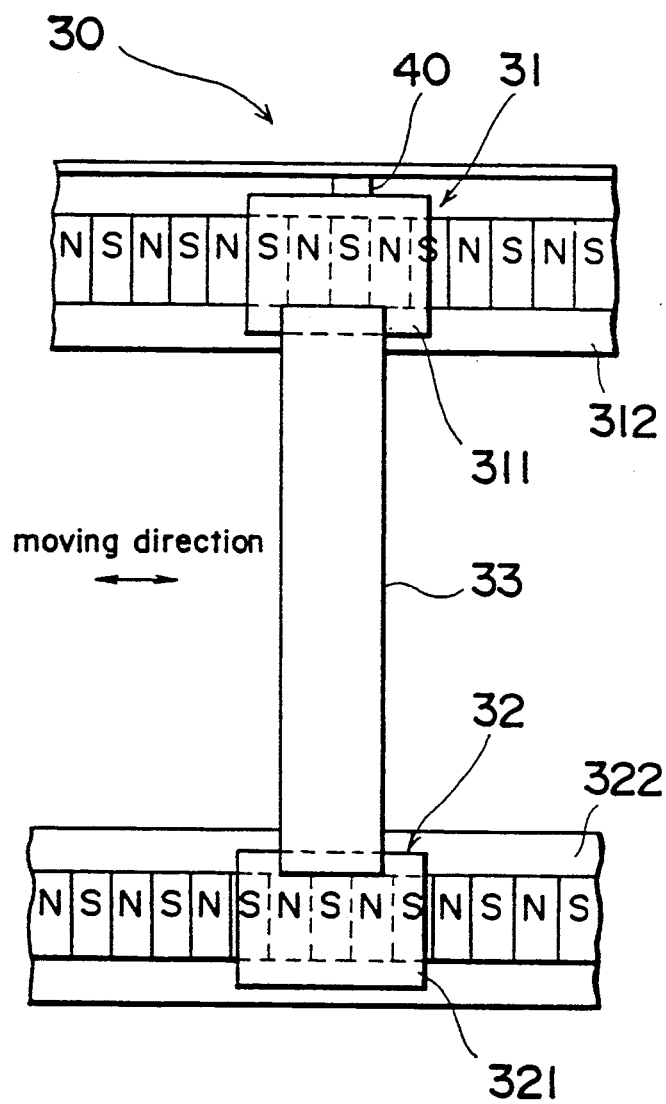 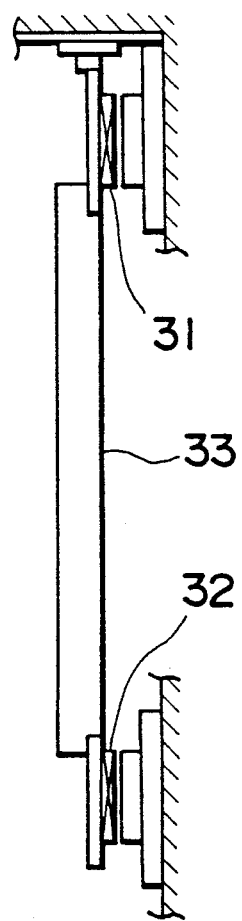

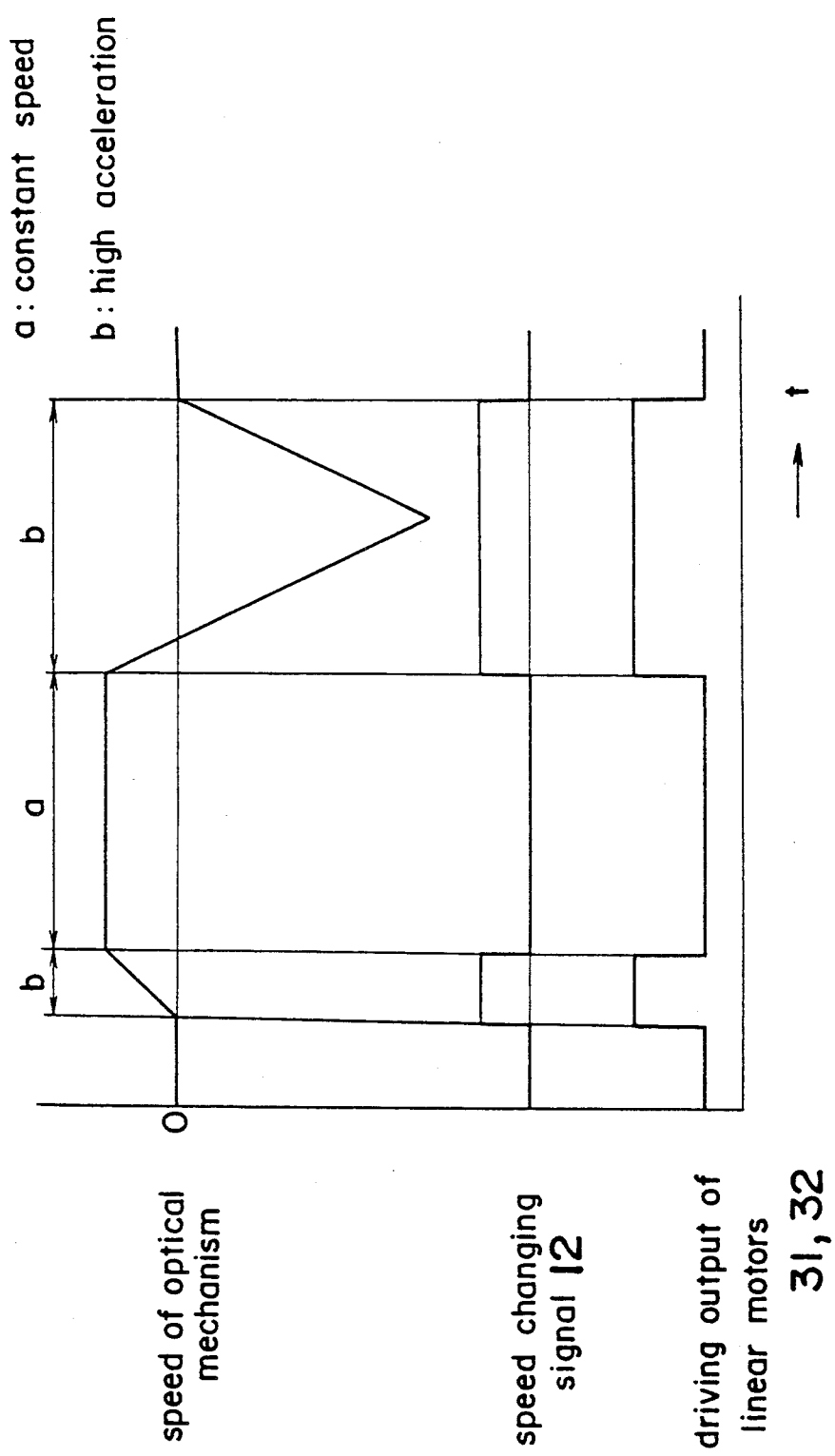

LINEAR DRIVING APPARATUS

BACKGROUND OF THE INVENTION

The present invention generally relates to a a linear driving apparatus for moving an optical mechanism and so on of a duplicating machine.

A duplicating machine of a document-stand fixing system and duplicating machines of a electronic photographic systems are provided with a linear driving apparatus which is adapted to alternately move an optical mechanism including an optical mechanism for drum projection use and an optical mechanism for document scanning use in a document scanning method.

The conventional linear driving apparatus is adapted to use two units of linear motors so as to cope with the higher speeds of the recent duplicating machines. The optical mechanism is adapted to move the optical mechanism at the given speed pattern through the linear motors. The electric construction of controlling the linear motors will be described with reference to FIG. 6.

A control circuit 10 mainly including microcomputers of so-called software servo compares the data on the movement position of the optical mechanism, which have been introduced through the feedback signals, with the feedback signals from the encoder 40, which have been disposed in the linear driving portion 30 as the linear motor is inputted into the control circuit 10, with the data on the speed pattern of the optical mechanism accommodated previously in the ROM and so on to generate the PWM signals in accordance with the comparison results. The PWM signal is introduced into a driving control portion 20, where the PWM signal is actually converted into an electrical signal for driving the linear driving portion 30 so as to respectively move the optical mechanisms as the speed pattern instructs. However, as shown in FIG. 3, the speed pattern of the optical mechanism is adapted to return the optical mechanism as far as the initial position at a high acceleration after the optical mechanism has been moved from the initial position at the constant speed.

However, in the above-described conventional embodiment, there is caused a following problem in the promotion of the higher speed of the duplicating machine. Namely, in order to shorten the time required for the duplicating operation, the acceleration is required to be set higher in the returning operation of the optical mechanism and so on, in other words, the driving output of the linear driving portion 30 is required to be increased. The considerable difference is caused between the constant speed condition and the high speed condition in the driving output of the linear driving portion 30. As a result, there is a disadvantage in that the speed control in the constant condition becomes rough so as to vary the speed and to cause noises. When the driving output of the linear driving portion as compared with that of the constant speed condition, the weight per bit of the PWM signal to be generated in the control circuit 10 has to be set higher, so that the closer control cannot be set in the constant speed condition. Such a disadvantage becomes an extremely large hurdle in the promotion of the higher speed of the duplicating machine.

SUMMARY OF THE INVENTION

Accordingly, an object of the present invention is to provide a linear driving apparatus which is capable of a closer controlling operation in the high accelerating condition, and also in the constant speed condition.

For the solution of the conventional problems, the present invention comprises linear driving means for alternately moving an object, speed setting means for generating a speed setting signal which gives a series of speed patterns for returning the moving object to an initial position at high acceleration speed after the moving object has been moved at a constant speed from the initial position, and also, for generating a speed changing signal which shows whether the present speed setting operation of the moving object is in the constant speed condition or in the high acceleration condition, and driving control means which controls the linear driving means in accordance with the speed setting signal, and also, varies the driving output of the linear driving means in accordance with the speed switching signal.

When the speed switching signal generated from the speed setting means shows the constant speed condition, the driving output of the linear driving means is set at a low level. When the speed switching signal shows the high speed condition, the driving output of the linear driving means is set at a high level.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1 through FIG. 5 illustrate one embodiment of a linear driving apparatus in the present invention.

FIG. 1 is an electric block diagram of a linear driving apparatus;

FIG. 2 shows the construction of the linear driving apparatus;

FIG. 2 (a), (b) are respectively a plan view thereof and a side view thereof;

FIG. 3 is a timing chart showing a speed pattern or the like of an optical mechanism;

FIG. 4 is a circuit block diagram of a motor output switching circuit;

FIG. 5 is a circuit block diagram showing a modified embodiment of the motor output switching circuit.

DETAILED DESCRIPTION OF THE PREFERRED EMBODIMENTS OF THE PRESENT INVENTION

Figure 1:
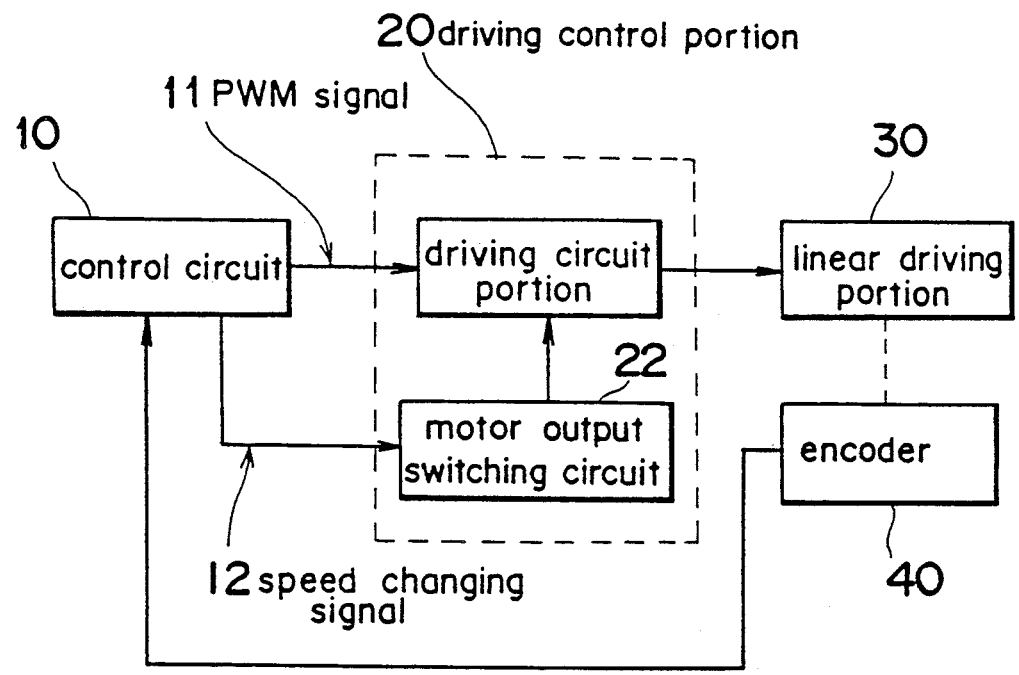

Before the description of the present invention proceeds, it is to be noted that like parts are designated by like reference numerals throughout the accompanying drawings.

Figure 4:
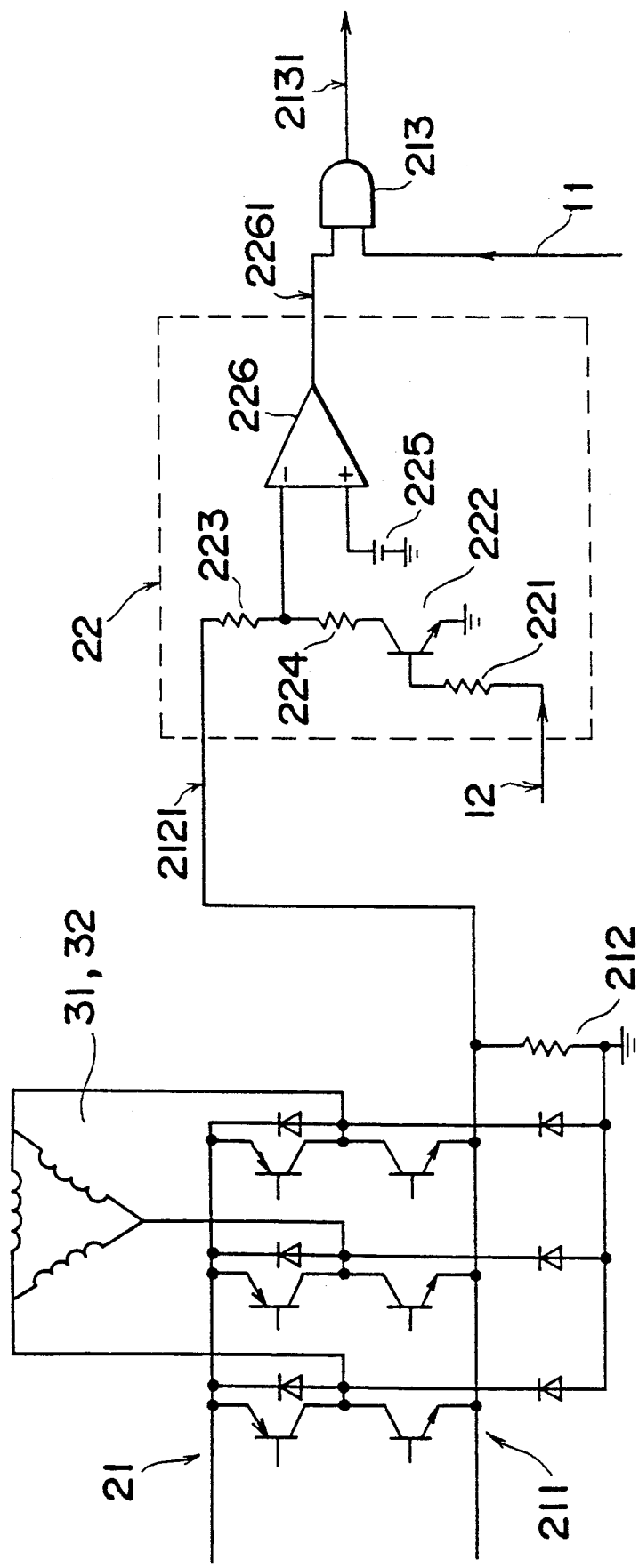
Figure 5:
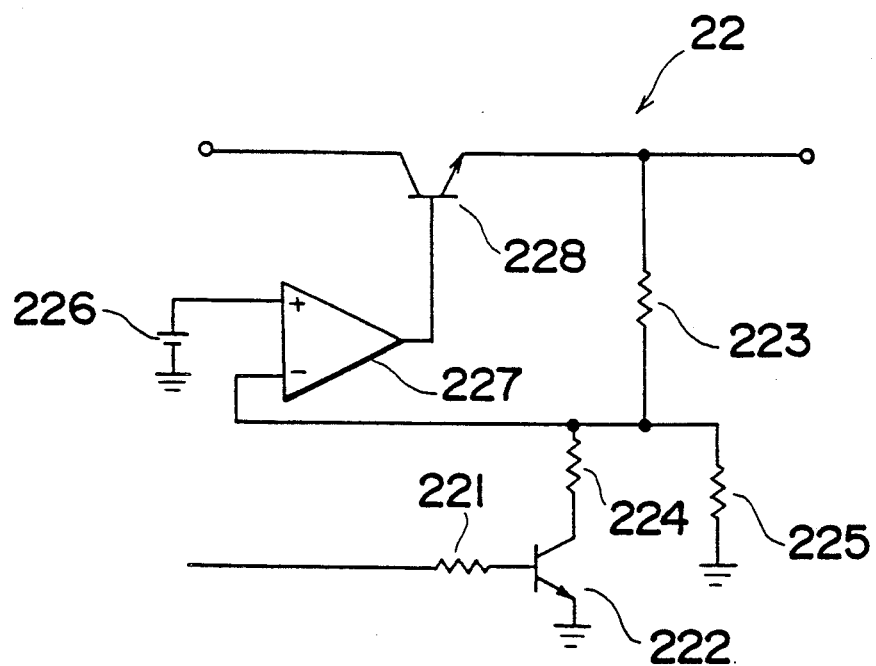
Figure 6:
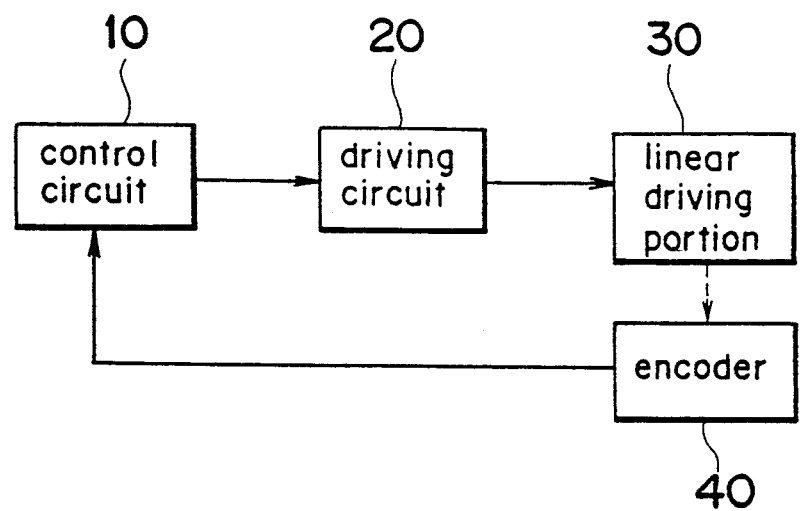
FIG. 6 is a diagram corresponding to that of FIG. 1 for illustrating the conventional linear driving apparatus.

Referring now to the drawings, there are shown in FIG. 1 and FIG. 2, an electric block diagram of a linear driving apparatus, and a construction of the linear driving means according to one preferred embodiment of the present invention. FIG. 2 (a), (b) are a plan view and a side view thereof. FIG. 3 is a timing chart showing the speed patterns and so on of the optical mechanism. FIG. 4 is a circuit block diagram of the motor output switching circuit. FIG. 5 is a circuit block diagram showing the modified embodiment of the motor output switching circuit.

The linear driving apparatus provided here is provided with an electronic photographic system, having a basic composition with two units of linear motors as the linear driving apparatus which are controllingly driven so as to move the optical mechanism at the given speed pattern in the document scanning direction. The linear driving portion 30 will be described hereinafter with reference to FIG. 2.

The linear motors 31 and 32 respectively include stators 312 and 322 with a plurality of permanent magnets being alternately magnetized on the top face of the stator yoke, and rotors 311 and 321 with three-phase windings secured onto the under face of the rotor yoke. The rotors 311 and 321 are coupled to each other with a coupling member 33 so as to alternately drive in an illustrated direction the optical mechanism secured on the top face of the coupling member 33. An encoder 40 for detecting the moving position of the optical mechanism is secured onto the side face of the rotor 311.

The speed pattern of the optical mechanism to be driven by the linear driving portion 30 will be described hereinafter with reference to FIG. 3. After the optical mechanism has been moved (in the constant speed condition a) at the constant speed from the initial position, it is adapted to be returned (in the high acceleration condition b) to the initial position at the high acceleration.

The electric construction for controlling the linear motors 31 and 32 will be described hereinafter with reference to FIG. 1.

The control circuit 10 which is equivalent to a speed setting device mainly includes microcomputers of a so-called software servo, with feedback signals 41 from the encoder 40 being inputted into it, compares the data on the moving position of the optical mechanism to be introduced through the feedback signals 41 with the data on the speed pattern accommodated previously in the ROM and so on to generate the PWM signal 11 in accordance with the comparison results. Furthermore, a speed changing signal 12 is generated, which shows whether the present speed setting is in a constant speed condition a or in a high speed condition b. The PWM signal 11, and the speed changing signal 12 are adapted to be both guided into the driving control portion 20, which feeds the power into the linear motors 31 and 32. When the speed changing signal 12 is at a high level, the high acceleration condition is adapted to be given. When the speed changing signal 12 is at a low level, the constant speed condition is adapted to be given.

The driving control portion 20 is provided with a driving circuit 21 for exciting in the three-phase the rotors 311 and 321 of the linear motors 31 and 32 in accordance with the PWM signal 11, and a motor output switching circuit 22 for varying the driving outputs of the linear motors 31, 32 in accordance with the speed switching signal 12. The driving control portion 20 will be described in further detail with reference to FIG. 4.

The driving circuit 21 is adapted to generate the three-phase exciting current through the switching operation, by the three-phase inverter circuit 211, of the direct current voltage produced by the converter circuit not shown. The detection resistor (Rs) 212 generates the three-phase exciting current detecting signal 2121 necessary to effect the current feedbacking operation. The three-phase exciting current detection signal 2121 and PWM signal 11 processed by motor output switching circuit 22 are inputted into an AND gate 213, where the operation of the logical product is effected.

The three-phase inverter circuit 211 is switched in accordance with a signal 2131 as the operation result so as to generate the three-phase exciting current.

The motor output switching circuit 22 is potentially divided by a potential division resistor 223 ($R_D$), a potential division resistor 224 ($R_E$) connected with a transistor 222 which operates both the end voltages of the detection resistor 212 by the speed changing signal 12 so as to compare the potential division voltage with the reference voltage ($V_{REF}$) of a reference voltage generator by the comparator 226 to guide the comparison result into the AND gate 213 as a signal 2261, so that a limit is applied upon the three-phase exciting current $I_m$ with it to vary the driving output of the linear motors 31 and 32.

When the speed changing signal 12 is at a high level, the three-phase exciting current $I_m$ shown by $$I_m = (X)V_{REF}/R_S$$

is to flow.

A modified embodiment of the motor output switching circuit 22 will be described hereinafter with reference to FIG. 5.

The motor output switching circuit 22 provided here varies the direct current voltage $V_m$ to be energized into the driving circuit 21 in accordance with the speed changing signal 12 so as to vary the driving outputs of the linear motors 31 and 32. The transistor 228 is connected with the output stage of the converter circuit. The transistor 228 is adapted to be operated in accordance with the output of an error amplifier 227. A reference voltage generator 226 for generating the reference voltage ($V_{REF}$) and potential division resistors 223 ($R_A$), 225 ($R_B$) and 224 ($R_C$) for potentially dividing the output voltage of the transistor 228 are connected with the input of the error amplifier 227. The potential division ratios of the potential division resistors 223 ($R_A$), 225 ($R_B$) and 224 ($R_C$) are adapted to be varied in accordance with the transistor 222 to be operated by the speed changing signal 12. The feedback loop of the transistor 228, the potential division resistor 223, and so on is formed in shape on the error amplifier 227 so as to vary the direct current voltage $V_m$ in accordance with the speed changing signal 12.

When the speed changing signal 12 is at a high level, the direct current voltage ($V_m$) shown by $$(V_m) = (V_{REF}/n_2)$$

wherein $n_2 = (R_B//R_C)/(R_A + R_B//R_C)$ is to energize the driving circuit 21.

When the speed changing signal 12 is at a low level, the direct current voltage $V_m$ shown by $$V_m = V_{REF}/n_1$$

wherein $n_1 = R_B/(R_A + R_B)$ is to energize the driving circuit 21.

Accordingly, when the optical mechanism is in the constant speed condition a, the driving outputs of the linear motors 31 and 32 are varied into the low level. When it is in the high acceleration condition b, the driving outputs of the linear motors 31 and 32 are varied into the high level, so that the weight per 1 bit of the PWM signal to be produced by the control circuit 10 is adapted to be changed by the constant speed condition a and the high acceleration condition b. Therefore, the close control operation may be effected not only in the high acceleration condition b, but also in the constant speed condition a. This means that the driving outputs of the linear motors 31 and 32 are set high, in other words, if the driving outputs of the linear motors 31 and 32 cause the difference in the high acceleration speed b and the constant speed condition a, neither the speed variation nor noises are caused in the constant speed condition a. Therefore, it is very significant in the promotion of the higher speed without reduction in the performance as a duplicating machine.

The linear driving apparatus in the present invention is, needless to say, applied to the duplicating machine. Furthermore, the linear driving apparatus may be provided in such a shape as to alternately move the object in the document scanning direction with the wire pulley mechanism and the rotary motor being coupled with each other.

As is clear from the foregoing description, according to the linear driving apparatus of the present invention, the driving output of the linear driving apparatus is adapted to be properly varied in the constant speed condition and the high acceleration condition, so that the closer controlling operation may be effected not only in the high acceleration condition, but also in the constant speed condition if there is considerable difference on the driving output of the linear driving apparatus in the constant speed condition and the high speed condition. Therefore, it is very significant in the promotion of the higher speed without the reduction in the performance of the apparatus.

Although the present invention has been fully described by way of example with reference to the accompanying drawings, it is to be noted here that various changes and modifications will be apparent to those skilled in the art. Therefore, unless otherwise such changes and the modifications depart from the scope of the present invention, they should be construed as included therein.

What is claimed is:

1. A linear driving apparatus of a closed loop type, comprising;
   linear driving means for moving an object in alternate directions;
   speed setting means for generating a speed setting signal which develops a series of speed patterns for returning said object to an initial position at a high acceleration speed after said object has been moved at a constant speed from said initial position, and also, for generating a speed switching signal which determines whether the present speed setting operation of said object is in said constant speed condition or in said high acceleration condition; and
   driving control means which controls said linear driving means in accordance with said speed setting signal, and simultaneously, varies the driving output of said linear driving means in accordance with said speed switching signal for precisely controlling the driving output of said linear driving means in both said constant speed condition and said high acceleration condition by freely changing between said constant speed condition and said high acceleration condition.

2. The linear driving apparatus according to claim 1, wherein said speed switching signal generated from said speed setting means initiates said constant speed condition when the driving output of said linear driving means is set at a low level, and said speed switching signal initiates said high speed condition when the driving output of said linear driving means is set at a high level.

* * * * *